United States Patent
Cheng et al.

(10) Patent No.: US 10,817,519 B2
(45) Date of Patent: Oct. 27, 2020

(54) AUTOMATIC CONVERSION STAGE DISCOVERY

(71) Applicant: Baidu USA LLC, Sunnyvale, CA (US)

(72) Inventors: Hsien-Ting Cheng, San Jose, CA (US); I-Hsuan Yang, Santa Clara, CA (US); Liangliang Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 527 days.

(21) Appl. No.: 15/173,937

(22) Filed: Jun. 6, 2016

(65) Prior Publication Data

US 2017/0351738 A1    Dec. 7, 2017

(51) Int. Cl.
| | |
|---|---|
| G06F 16/00 | (2019.01) |
| G06F 16/2457 | (2019.01) |
| G06F 16/248 | (2019.01) |
| G06F 40/30 | (2020.01) |

(52) U.S. Cl.
CPC ...... *G06F 16/24575* (2019.01); *G06F 16/248* (2019.01); *G06F 40/30* (2020.01)

(58) Field of Classification Search
CPC ........... G06F 17/30528; G06F 17/2785; G06F 17/30554; G06F 16/9535; G06F 16/24575; G06F 40/30; G06F 16/248
See application file for complete search history.

(56) References Cited

U.S. PATENT DOCUMENTS

| | | | | |
|---|---|---|---|---|
| 7,536,413 | B1 * | 5/2009 | Mohan | G06F 17/3071 |
| 7,996,393 | B1 * | 8/2011 | Nanno | G06F 17/30696 |
| | | | | 707/723 |
| 8,041,730 | B1 * | 10/2011 | Upstill | G06F 17/30241 |
| | | | | 707/706 |
| 8,478,699 | B1 * | 7/2013 | Alfonseca | G06F 17/3064 |
| | | | | 706/12 |
| 8,478,773 | B1 * | 7/2013 | Bryukhov | G06F 17/30867 |
| | | | | 705/14.49 |
| 9,342,626 | B1 * | 5/2016 | Das | G06F 16/90324 |
| 9,519,722 | B1 * | 12/2016 | Parikh | G06F 17/3087 |
| 9,633,312 | B1 * | 4/2017 | Baluja | G06F 17/30522 |
| 9,720,974 | B1 * | 8/2017 | Sarmento | G06F 17/30525 |
| 2005/0234972 | A1 * | 10/2005 | Zeng | G06F 17/30864 |
| 2006/0064411 | A1 * | 3/2006 | Gross | G06F 16/90324 |

(Continued)

*Primary Examiner* — Leslie Wong
(74) *Attorney, Agent, or Firm* — Womble Bond Dickinson (US) LLP

(57) ABSTRACT

A user can issue a query about a process that has a number of stages. A stage of the process is determined using the query and location data associated with the query, and a stage prediction model. A stage learning system can select a sample of query logs for a category from a database of millions or billions of users' queries. Queries can be parsed into keywords. A category can be determined from location information associated with each query and from query keywords. Queries are aligned based on location and, optionally, keywords. TF-IDF values are computed for queries and are used to determine a difference significance between aligned, adjacent queries. If aligned, adjacent queries have a substantially difference in keywords and TF-IDF, then a conversion stage is identified. Content can be presented to the user based on the category, keywords, location, and conversion stage.

15 Claims, 6 Drawing Sheets

(56) References Cited

U.S. PATENT DOCUMENTS

| | | | |
|---|---|---|---|
| 2006/0143175 A1* | 6/2006 | Ukrainczyk | G06F 17/218 |
| 2007/0060114 A1* | 3/2007 | Ramer | G06F 16/9535 |
| | | | 455/418 |
| 2007/0061245 A1* | 3/2007 | Ramer | G06Q 10/10 |
| | | | 705/37 |
| 2007/0061336 A1* | 3/2007 | Ramer | G06Q 30/02 |
| 2007/0266002 A1* | 11/2007 | Chowdhury | G06F 16/3326 |
| 2008/0172357 A1* | 7/2008 | Rechis | G06F 16/9537 |
| 2009/0006207 A1* | 1/2009 | Datar | G06Q 30/03 |
| | | | 705/14.54 |
| 2009/0319517 A1* | 12/2009 | Guha | G06F 17/30864 |
| 2012/0005021 A1* | 1/2012 | Ratnam | G06Q 30/0201 |
| | | | 705/14.54 |
| 2012/0239498 A1* | 9/2012 | Ramer | H04H 60/46 |
| | | | 705/14.53 |
| 2013/0246412 A1* | 9/2013 | Shokouhi | G06F 17/30867 |
| | | | 707/730 |
| 2014/0324812 A1* | 10/2014 | Cooper | G06F 17/275 |
| | | | 707/706 |
| 2014/0358906 A1* | 12/2014 | Behzadi | G06F 17/3053 |
| | | | 707/723 |
| 2016/0180728 A1* | 6/2016 | Clark | G06F 17/2785 |
| | | | 434/362 |
| 2017/0316085 A1* | 11/2017 | Gupta | G06F 17/30401 |

* cited by examiner

AUTOMATIC CONVERSION STAGE DISCOVERY

FIELD OF THE INVENTION

Embodiments of the present invention relate generally to secondary content. More particular embodiments are related to pushing content to a device of a user based on a particular stage at which the user is interacting with a content server.

BACKGROUND

Targeting users at the right time with the appropriate content has always been the holy grail for the content delivery industry. In a typical content scenario, different content is displayed based on what keywords are triggered from a query (keywords can be words contained in a query or words associated to a query). Content providers have to manually select keywords or take keywords suggested by third parties with little knowledge about where the user is in a multi-stage conversion path. Conversions can either be online (visit website, click purchase button, download App) or offline (visit physical store location). With the assumption that a user's conversion is an outcome of a series of logical process, conversion stage is a valuable abstraction to content providers. For example, eyelid surgery operation may consist of the following conversion stages: survey compare convert post-convert. Knowing which stage a user is in provides content providers good insight on how to target their content to users.

Existing conversion stage models are mostly handcrafted. For different verticals, content providers create stages based on their past experience. Keywords associated with a stage are also inserted by manually.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
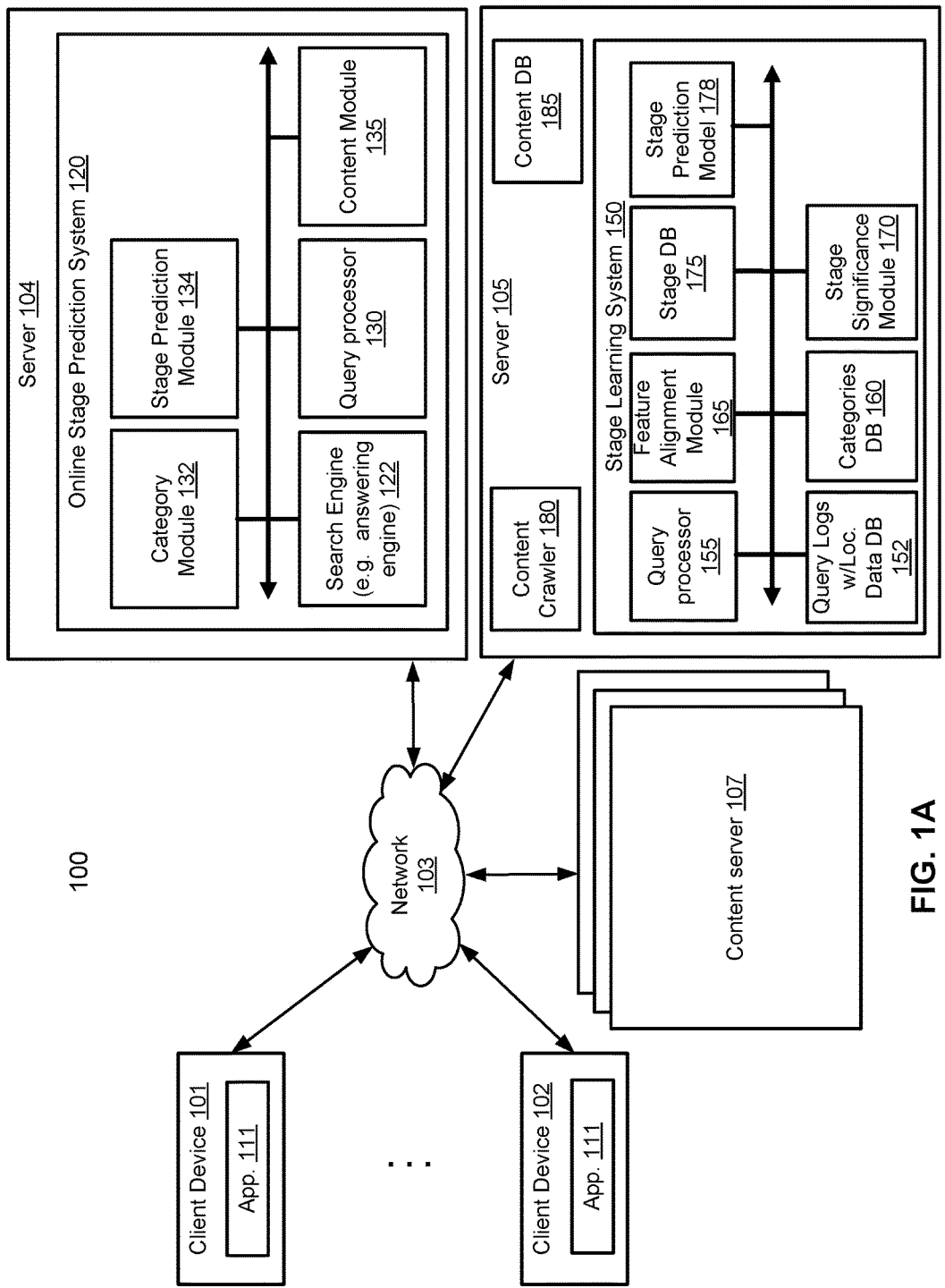
FIG. 1A is a block diagram illustrating an example of an online system for determining the conversion stage a user is in for a multi-stage process and presenting content to the user based upon the conversion stage, according to an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a computer-implemented method can have a process can have a plurality of conversion stages. A multi-stage process can be a decision-making process, an action-taking process, or other multi-stage process wherein it is desirable to the user and to content providers to identify the particular stage, among the plurality of stages, that the user is in while the user interacts with a search engine. Each conversion stage represents a discrete part of a process for which a user has issued one or more queries to gain information relevant to the particular conversion stage in the process. Each query can have location information associated with the query. For example, a user may be located at home when issuing queries to locate motorcycle dealers at which to research a new motorcycle. Later, the user may be in a motorcycle dealership issuing queries about pricing or test rides of a particular model of motorcycle. Still later, a user may be back in a motorcycle shop deciding whether to purchase the motorcycle. Each of these are a conversion stage in the process involving queries about a motorcycle. Location information indicating where the user is located at the time of a query can be used in conjunction with the query keywords to determine a category for the multi-stage process. A conversion stage prediction model can use the category, location information, and query keywords to determine a particular conversion stage that this user is in with regard to a multi-stage process (in this case, buying a motorcycle).

In another embodiment, a stage prediction model can be generated from a sample for a substantial number of query logs of users for a particular category. In an embodiment, a query logs for the category can be extracted that that have a similar number of queries in the multi-stage process. Keywords can be determined from the queries. Queries can be aligned based on location information. A term-frequency/inverse document frequency (TF-IDF) can be determined for the keywords, with a "document" (for IDF) being the sum of the queries within a particular alignment of queries. Alternatively, a "document" can be the sum of the queries for the category. Query alignment can be refined using TF-IDF and location information to determine a difference significance measure between adjacent aligned queries. The degree to which adjacent queries differ, aligned by location, is a good indicator for identifying a conversion stage.

In an embodiment, any of the above functionality can be embodied as executable instructions stored on non-transitory computer-readable medium. In an embodiment, a system can comprise at least one hardware processor coupled to a memory comprising instructions that, when executed by the at least one hardware processor, can implement any of the above functionality.

FIG. 1A is a block diagram illustrating an example of an online system 100 for determining the conversion stage of a multi-stage process that user is in based on a query about the process and presenting content to the user based upon the conversion stage according to an embodiment of the invention. Referring to FIG. 1A, system 100 includes, but is not limited to, one or more client devices 101-102 communicatively coupled to servers 104, and 105 over network 103. Client devices 101-102, also referred to as user devices, may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless. Client devices 101 and 102 can have one or more applications 111, such as a web browser, to facilitate interaction with server 104. One or more content servers 107 can be coupled to the network 103, and are accessible to servers 104 and 105.

According to one embodiment, user device 101 may be associated with an end user, where user device 101 may be a mobile device (e.g., tablets), a Smartphone, a Smartwatch, or a device capable of communicating with other devices over a network 103. User device 102 may be an agent device of an agent, a person or an associate associated with a particular entity or organization, where agent device 102 may also be a mobile device (e.g., tablets, a Smartphone, a Smartwatch), or a device capable of communicating with other devices over a network. For example, an agent may be associated with a content provider of a particular content item, in this example, a content provider providing a particular content item (e.g., sponsored content item). For the purpose of illustration, throughout the present application, communications between a user device, an agent device, and a server will be described to illustrate the techniques of tracking user and agent interactions with content items, routing data amongst a user device, an agent device, and a server, and connecting a user of the user device with an agent of the agent device. However, it will be appreciated the techniques described throughout this application can also be applied to other scenarios.

Servers 104, 105, and 107 may be any kind of server or clusters of servers, such as Web or cloud servers, application servers, backend servers, or a combination thereof. In one embodiment, server 104 can include, but is not limited to, an online stage prediction system 120. In an embodiment, server 104 can also include a stage learning system 150. In another embodiment, stage learning system 150 can be on a server 105. Online stage prediction system 120 can include search engine 122, query processor 130, category module 132, stage prediction module 134, and content module 135. Server 104 can further include an interface (not shown) to allow a client such as client devices 101-102 to access resources or services provided by server 104. The interface may include a Web interface, an application programming interface (API), and/or a command line interface (CLI).

A client user application 111 of user device 101, may send a search query to server 104 and the search query is received by search engine 122 via the interface over network 103. In response to the search query, search engine 122 can extract one or more keywords from the search query. Query processor 130 can also associate location information of the query with the keywords. Category module 132 can receive location information and keywords from query processor 130 to determine a category for the query. Category module 132 can determine the location of the user and determine, e.g., that the user was in a motorcycle shop at the time of the query. A category can be general or specific. A category can have sub-categories. For example, query module 132 can determine from location information and, optionally, keywords, that the user is interested in a surgery, specifically an eyelid surgery, which is a sub-category of the category "surgery." Or, the user may be interested in motorcycles, specifically deciding whether to purchase a new motorcycle, which is a sub-category of the category "motorcycle." Stage prediction module 134 can determine the stage the user is in, termed a "conversion stage," with respect to a multi-stage process. For example, the user may be in a pre-operation stage regarding a surgery. The location of the user may be inside a hospital at the time of the query. Alternatively, the user may be in a post-operation stage regarding the surgery. The query may include search terms for post-operation care, dietary considerations, pharmacies, recovery times, etc. Based upon the conversion stage and keywords in the query, content module 135 can present content to the user. Content can be based upon category, location, conversion stage, and/or keywords in the query. For example, content for a category of eyelid surgery, in the pre-operation conversion stage, may include content about hospitals, pharmacies, physicians and other care related to an eyelid surgery. Content 107 can also include links to medical articles related to the surgery, pre-operation considerations such as whether the user should plan to have someone drive him home after the surgery, ride services that perform post-operation driving service, etc. For a category of motorcycles, at an initial conversion stage, content can include the location of dealership(s) near the user, the availability of the model of motorcycle for which the user queried, model specifications, sales promotions, trade-in offers, warranties, test ride information, insurance information, rider groups, training for new riders, etc.

Server 105 can include a stage learning system 150, an content crawler 180, and an content database (DB) 185. Stage learning system 150 can alternatively be implemented on server 104. Stage learning system 150 can include a database of stored query logs 152 of a large number of users, and a query processor 155. Query processor 155 can query the query logs for a particular category. In an embodiment, query processer 155 can apply a stochastic process to select a subset, or sample, of the query logs for a particular category. In an embodiment, query processor 155 can use categories database (DB) 160 to determine locations and/or keywords to use to select queries for a particular category. In an embodiment, query processor 155 can select query logs for a category that have a similar number of queries issued during the multi-stage process. Feature alignment module 165 can align query features, using keywords and locations, to determine likely conversion stages. Stage significance module 170 can determine whether differences between sequential queries of a user are sufficiently different to determine that a conversion stage is indicated by significant difference between adjacent queries. In an embodiment, stage significance module 170 can apply Chi-Square distribution to determine a goodness of fit of keywords to a conversion stage. A significant change in distribution of keywords can indicate a stage conversion as between two adjacent alignment of queries. Identified conversion stages can be stored in stage database (DB) 175. Storing a conversion stage can include storing the category, keywords, and optionally location data from the query that indicated a stage conversion. The stage learning system 150 can process a large sample of users' queries related to the category to determine a confidence model for stage conversion keywords for a category. Stage learning system 150 can further include a stage prediction model 178 that incorporates categories, conversion stages, keywords and TF-IDF significance measures between adjacent stages.

In an embodiment, identified stage conversions for a particular multi-stage process, their respective keywords, and location information can be sold to content providers. In an embodiment, identified stage conversions for a particular multi-stage process, their respective keywords, and location information can be auctioned to bidders.

Server 105 can further include content crawler 180 and content database (DB) 185. Content crawler 180 can crawl the web, accessing content such as on content server(s) 107. Content obtained by content crawler 180 can be filtered and stored on content DB 185 so that it is readily accessible to content module 135 on server 104. In an embodiment, storing content in content DB 185 can include storing a link or URL to content and metadata related to the link or URL to the content. In an embodiment, one or more keywords related to the content can be stored with the content in content DB 185. In an embodiment, keywords related to content can be obtained from categories DB 160 and/or stages DB 175.

The user application 111 on client devices 101 and 102 may be a browser application or a mobile application if the user device is a mobile device. Search engine 122 may be a Baidu® search engine available from Baidu, Inc. or alternatively, search engine 122 may represent a Google® search engine, a Microsoft Bing™ search engine, a Yahoo® search engine, or other search engine.

A search engine 122, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines 122 also maintain real-time information by running an algorithm on a web crawler, such as content crawler 180.

Web search engines 122 work by storing information about many web pages, which they retrieve from the hypertext markup language (HTML) markup of the pages. These pages are retrieved by a Web crawler, e.g. content web crawler 180, which is an automated Web crawler which follows every link on the site. The search engine 122 then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible. In an embodiment, pages are stored in content database (DB) 185.

When a user enters a query into a search engine 122 (typically by using one or more keywords), the search engine 122 examines its index and provides a listing of best-matching web pages according to its criteria, usually with a short summary containing the document's title and sometimes parts of the text. The index is built from the information stored with the data and the method by which the information is indexed. The search engine 122 looks for the words or phrases exactly as entered. Some search engines 122 provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine 122 depends on the relevance of the result set it gives back. While there may be millions of web pages that include a particular word or phrase, some pages may be more relevant, popular, or authoritative than others. Most search engines 122 employ methods to rank the results to provide the "best" results first. How a search engine 122 decides which pages are the best matches, and what order the results should be shown in, varies widely from one engine to another.

Server 104 can correlate an identifier of a user with search activities associated with the user from interaction with search engine 122 and storage of search logs in a query log database 152. In an embodiment, an identifier of a user can be an identifier of the electronic device that the user uses to issue search queries. In an embodiment, a user identifier can be a login, such as a login credential to utilize the search engine 122. The search activity information may be captured and recorded in query log database 152 when a search was performed. In an embodiment, a query log can be associated with the identifier of the user that issued the query. The server 104 can retrieve user information of the user from query log database 152. Additional details of stage learning system 150 are described below with reference to FIG. 1C.

Figure 1B:
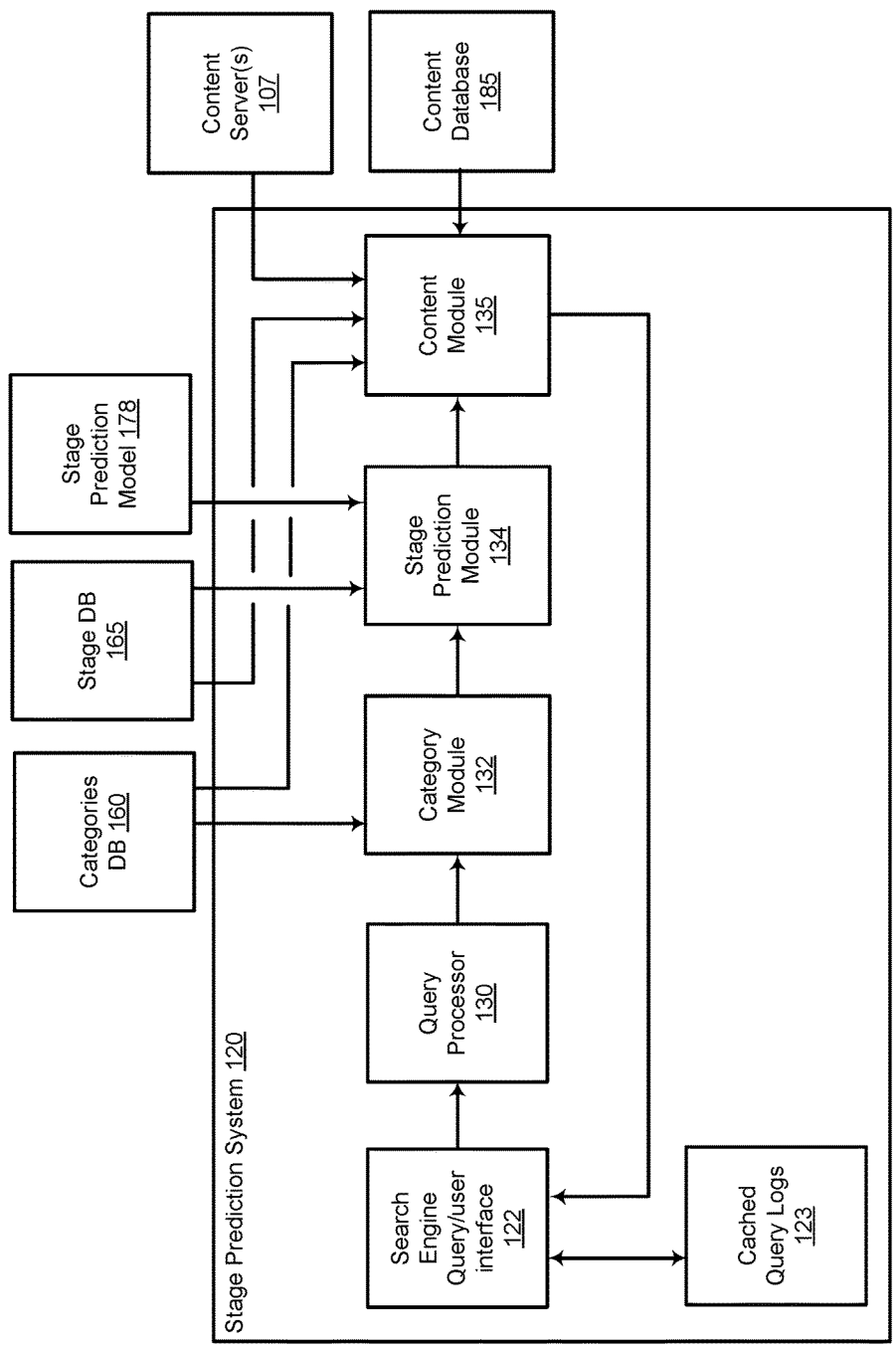
FIG. 1B is a block diagram illustrating an online system for determining the conversion stage of a user in for acquiring content, according to an embodiment of the invention.

FIG. 1B is a block diagram illustrating an online stage prediction system 120 for determining a conversion stage in a multi-stage process that a user is in at the time of issuing a query according to an embodiment of the invention.

A client, such as client 101, can begin using the online stage prediction system 120 by issuing a query to query/user interface of search engine 122. In an embodiment, search engine 122 can identify a user by a hardware identification of client 101 contained within the query received from the user. In an embodiment, a user can be identified by a user login to the online stage prediction system 120 or search engine 122. User queries can be cached in cached query logs 123 so that previous and subsequent ("adjacent") queries by a same user can be accessed to determine a difference significance between adjacent queries to determine a conversion stage in a multi-stage process that the user is in at the time of a query. Query preprocessor can process the user's query, and one or more adjacent queries, into one or more keywords. Category module can use the keywords and location data associated with the query, and category database 160 to determine a category of the query. Stage prediction module 134 can use stage database 165, stage prediction model 178, and the keyword and category received from category module 132 to determine a conversion stage of a multi-stage process that the user is in at the time of the query. Content module 135 can receive the category of the query, keywords in the query, and the conversion stage from stage prediction module 134. Content module 135 can also receive additional category keywords and conversion stage keywords from categories DB 160 and stage DB 165, respectively. Content module 135 can any/all of the received information to determine content to present to the user in response to the query, along with the query results at query/user interface 122. Content can be obtained from content servers 107 and/or content database 185.

Figure 1C:
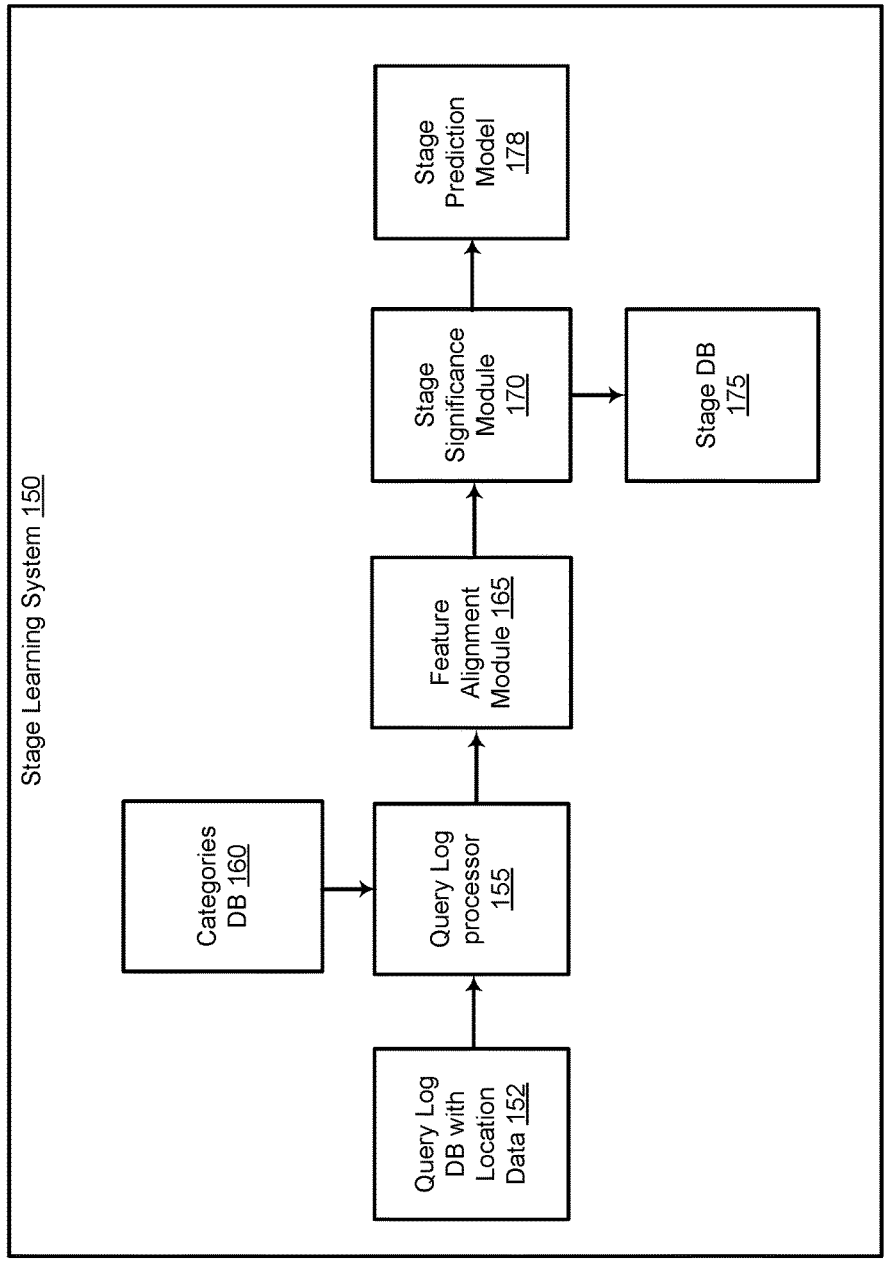
FIG. 1C is a block diagram illustrating an information and logic flow of a conversion stage discovery learning system for use in an online system that determines the conversion stage of a user in a multi-stage process, according to an embodiment of the invention.

FIG. 1C is a block diagram illustrating an information and logic flow of a stage conversion learning system 150 for use in generating stage prediction model 178 that is used by a stage prediction system 120 according to an embodiment of the invention.

Each time a user accesses the search engine 122 of the stage conversion prediction system 120, the user's query can be stored in a query log database (query log DB) 152. Query logs in the query log DB 152 contain one or more queries of a large number of users. In an embodiment, query logs DB 152 an contain query logs of over a billion users. In an embodiment, each query can be associated with an identifier of the user such that all queries of a particular user can be extracted. Query logs can also be stamped with location data, such as GPS coordinates, one or more cell tower identifiers, a WiFi identifier, a network address, or a combination of these, to determined whether as user has gone to a hospital, and for how long the user went to the hospital. In an embodiment, each query can be stored with a date/time stamp that the query was received by search engine 122.

Query log processor can select a sample of query logs for a plurality of users from query logs DB for a particular category. In an embodiment, a category definition is received by the query log processor 155 from categories DB 160. In an embodiment, the sample of query logs is selected to a have substantially similar number of queries issued for a multi-stage process. For example, a typical user may issue eleven (11) queries in a multi-stage process for selecting and obtaining an eyelid surgery, and follow-up care. Thus, for example, queries may be selected from query log DB 152 having a between 9 and 13 queries to complete a stage in the multi-stageprocess that includes queries related to a next stage of the multi-stage process, such as follow-up care after a surgery. Having a similar number of queries for a multi-stage process facilitates feature alignment for determining stage conversion.

For the large plurality of users in the sample, feature alignment module 165 can align the queries, initially, based on location of where the user was at the time of a query. For example, a user may be initially be at home when performing early research about hospitals, doctors, and eyelid procedure general information. Later, a user may go to one or more hospitals to visit with hospital staff, and see the hospital facility. The user may then issue queries located at the hospital that are directed to research about the hospital and particular doctors, etc. At a later date, the user may have the eyelid surgery at the hospital and perhaps issue queries about taxi rides home, post-operation food, care, or medicines that apply to the particular surgery. Still later, the user may be at home and issue queries about in-home care, recovery time form the procedure, and other post-operation details. Feature alignment module 165 can use the location and keywords of the query to align the queries. Stage significance module can perform a term-frequency/inversion document-frequency (TF-IDF) computation on the aligned queries to determine a measure of difference between adjacent queries. In an embodiment, a "document" (for IDF) is the sum of the queries in the sample for the category. In an embodiment, a "document" is the sum of the queries aligned by feature (location or keyword). Stage significance module 170 can initially use, e.g., Chi-Square distribution, to determine a distribution of keywords and TF-IDF of the keywords. An integer programming algorithm, such as a simulated annealing algorithm, can be used to determine significance difference between adjacent aligned queries. A maximum difference between aligned queries indicates a stage conversion. Stage significance module 170 can output the category, stage conversion description, keywords and related TF-IDFs and stage significance values to stage DB 175. Stage prediction model 178 can store the same, or a subset of the same, information for use by stage prediction system 120.

Figure 2:
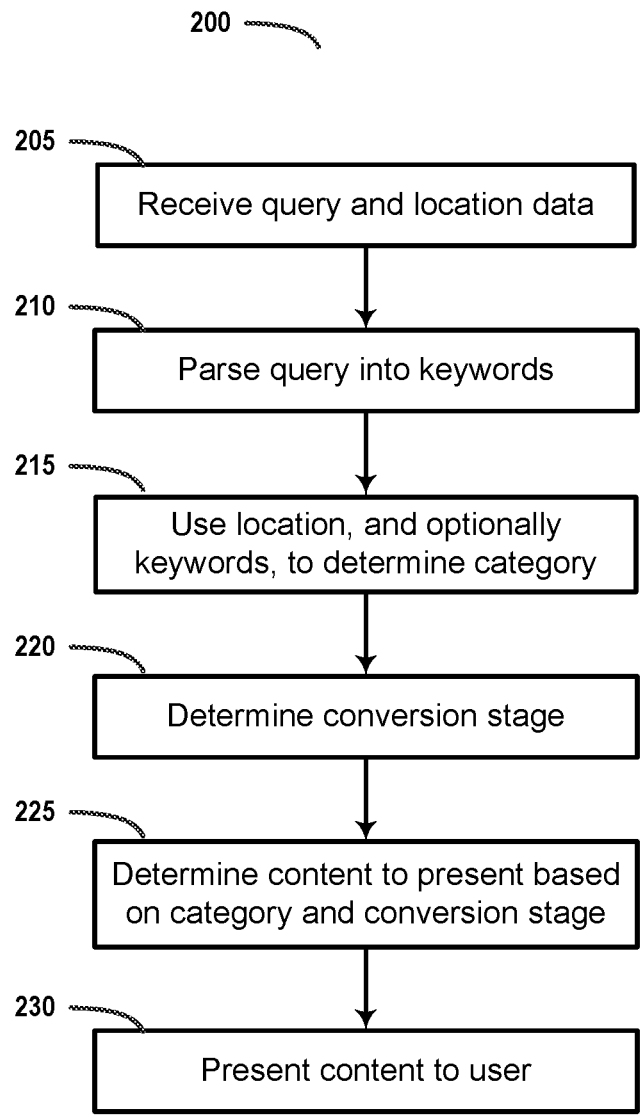
FIG. 2 is a block flow diagram of a method of determining the conversion stage of a user in a multi-stage process and presenting content to the user in accordance with the conversion stage, according to one embodiment of the invention.

FIG. 2 is a block flow diagram of a method 200 of determining a conversion stage of a multi-stage process that a user is in at the time of issuing a query related to the multi-stage process according to one embodiment of the invention.

In operation 205, search engine query/user interface 122 of online stage conversion prediction system 120 can receive a user query/input containing keywords relating to a multi-stage process. In operation 210, the query processor 130 can receive the query and location information associated with the query from the search engine query/user interface 122. The query processor 130 can then parse the user query into one or more keywords 132 and determine a location of the user from location information associated with the query. In operation 215, category module 132 can receive the query, keywords, and location information from query processor 130 and determine a category for the query. In operation 220, stage prediction module 134 can determine the conversion stage of the multi-stage process that the user was in at the time of the query. The stage prediction module 134 receives the category, location, and query keywords from category module 132. Stage prediction module 134 can also receive, or access, conversion stage information in stage DB 165. Stage prediction module 134 can also utilize stage prediction model 178, using the category, keywords, and optionally location to determine the conversion stage of the user for the multi-stage process related to her query. In operation 230, the content module 135 within the online stage prediction system 120 can select and present content to the user via search interface 122.

Figure 3:
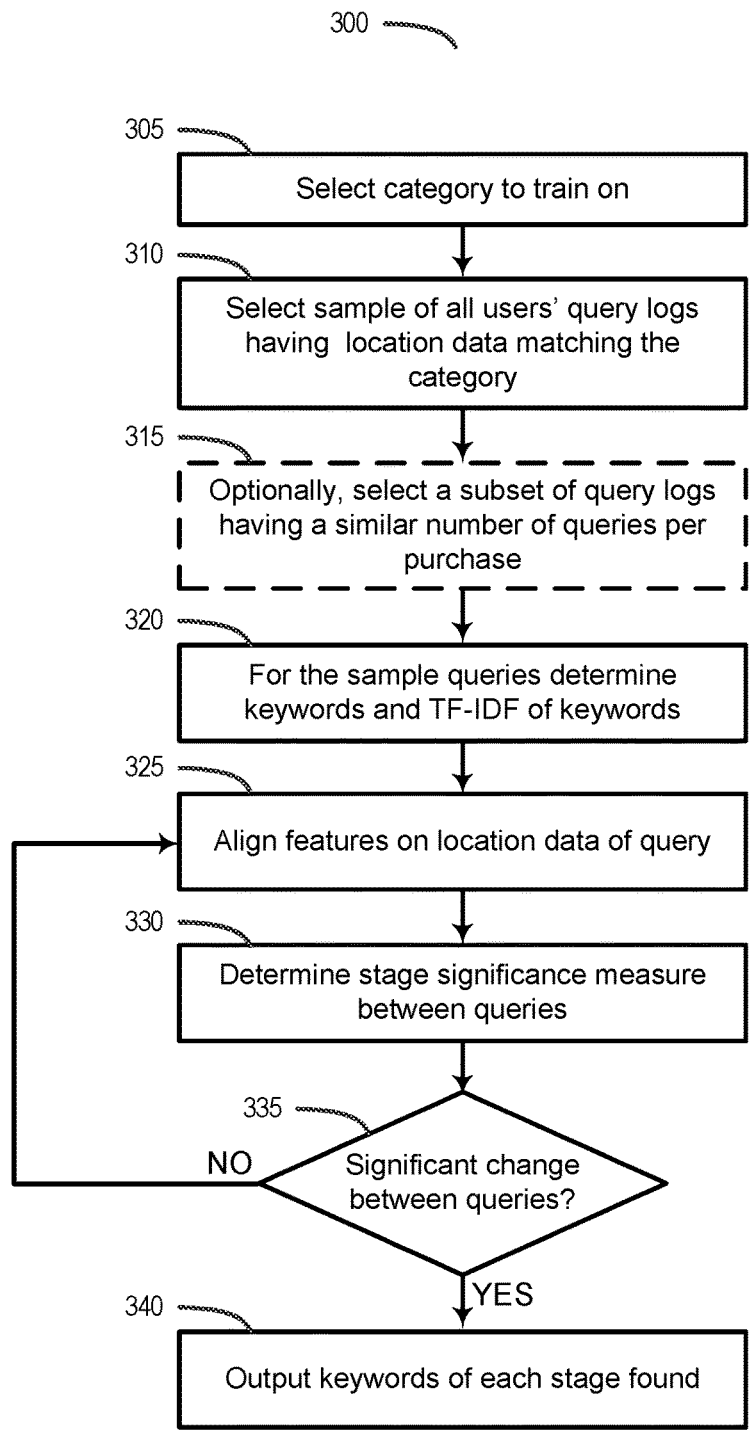
FIG. 3 is a block flow diagram of a method of a conversion stage discovery learning system according to one embodiment of the invention.

FIG. 3 is a block flow diagram of a method 300 of training a model 178 that determines a conversion stage of multi-stage process that a user is in at the time of a query according to one embodiment of the invention.

In operation 305, stage learning system 150 can select a category or sub-category on which to train the stage prediction model 178. A category can be, for example, "Motorcycles" and a sub-category may be "Purchase a Motorcycle." In operation 310, query log processor 155 can receive category information, such as keywords and/or location information. Query log processor 155 can they select the query logs DB 152 to obtain a sample of query logs related for the category. In operation 315, query log processor 155 can optionally select query logs having a substantially similar number of queries for the multi-stage process for the category. In operation 320, query processor 155 determine a plurality of keywords over the sample of queries, and the term-frequency/inversion document frequency (TF-IDF) for one or more of the keywords. In operation 325, feature alignment module 165 can use location data, keywords, and keyword TF-IDF information to align query feature to determine one or more conversion stages. In operation 330, stage significance module 170 can determine a difference significance measure to find significant changes between adjacent queries. In embodiment, an integer programming algorithm, such as a simulated annealing algorithm, can be used to model difference significance between adjacent aligned queries. In operation 335, if the difference significance between aligned queries is not significant enough, then the integer programming algorithm continues searching for a conversion stage based upon a difference significance measure between adjacent aligned queries. If a significant change is found between adjacent aligned queries, then in operation 340, stage significance module 170 outputs each conversion stage found, and information associated with each stage, to stage DB 175 and stage prediction model 178. Information output to stage DB 175 can include conversion stage keywords, TF-IDF values for the keywords, location information, and category. A query log sample size, in terms of average number of queries/user, number of users of queried data, and/or number of locations in the sample may also be output to stage DB 175. Conversion stage information output to the stage prediction model 178 can include the category, number of conversion stages, description of the conversion stages, keywords for each conversion stage, TF-IDF values for each keyword, and difference significance values used to identify each stage.

Figure 4:
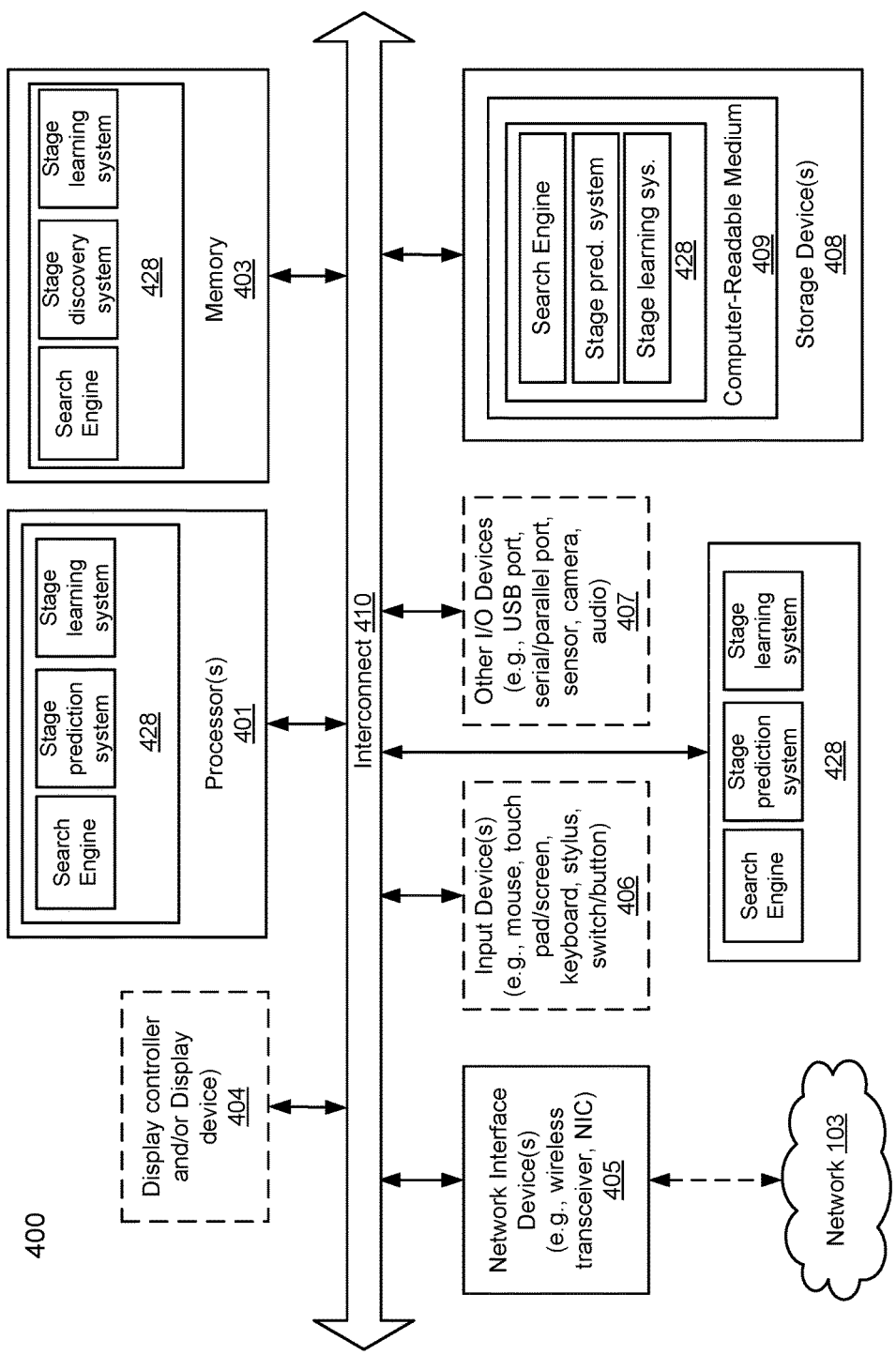
FIG. 4 is a block diagram illustrating a data processing system according to one embodiment.

FIG. 4 is a block diagram illustrating an example of a data processing system 400 which may be used with one embodiment of the invention. For example, system 400 may represent any of data processing systems described above performing any of the processes or methods described above, such as, for example, a client device 101 or 102, a server 102, or server 104 described above.

System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations and steps discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices 405-408, including network interface device(s) 405, optional input device(s) 406, and other optional IO device(s) 407. Network interface device 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with display device 404), a pointer device such as a stylus, and/or a keyboard (e.g., physical keyboard or a virtual keyboard displayed as part of a touch sensitive screen). For example, input device 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-accessible storage medium 409 (also known as a machine-readable storage medium or a computer-readable medium) on which is stored one or more sets of instructions or software (e.g., module, unit, and/or logic 428) embodying any one or more of the methodologies or functions described herein. Module/unit/logic 428 may represent any of the components described above, such as, for example, a search engine, an online prediction system, or a prediction learning system as described above. Module/unit/logic 428 may also reside, completely or at least partially, within memory 403 and/or within processor 401 during execution thereof by data processing system 400, memory 403 and processor 401 also constituting machine-accessible storage media. Module/unit/logic 428 may further be transmitted or received over a network via network interface device 405.

Computer-readable storage medium 409 may also be used to store the same software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 428, components and other features described herein can be implemented as discrete hardware components or integrated in the functionality of hardware components such as ASICS, FPGAs, DSPs or similar devices. In addition, module/unit/logic 428 can be implemented as firmware or functional circuitry within hardware devices. Further, module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining content to be presented to a user during a user session having a plurality of stages, the method comprising:

receiving from an electronic device of the user during a first user session, a first query having one or more first query terms and first location data, the first location data indicating a first geographic location of the electronic device;

determining a category of a decision-making or action-taking process associated with the user session based at least in part on the first location data;

determining a first stage of the plurality of stages that are associated with the first user session based on the first query terms, the first location data, and the category of the decision-making or action-taking process using a stage prediction model, the stage prediction model having been generated through a training process based on user query logs;

identifying one or more content items that are associated with the first stage;

transmitting to the electronic device a first content item selected from the one or more content items associated with the first stage;

receiving, from the electronic device, a second query having second query terms and second location data;

analyzing the first query terms and the second query terms;

calculating a difference significance value between the first query terms and the second query terms based on the analysis;

determining a second stage of the plurality of stages based on the difference significant value between the first query terms and the second query terms; and transmitting to the electronic device a second content item associated with the second stage.

2. The method of claim 1,
wherein the second location data indicates a second geographic location of the electronic device
wherein the first content item and the second content item are different content items.

3. The method of claim 1,
wherein the user session is in the second stage if the difference significant value is greater than a predetermined threshold.

4. The method of claim 2, wherein first location data and second location data refer to a same geographic location.

5. The method of claim 1, wherein determining the category is performed further based at least in part on the first query terms.

6. A non-transitory computer-readable medium having stored thereon executable instructions that, when executed by at least one hardware processor, perform operations for determining content to be presented to a user regarding a user session having a plurality of stages, the operations comprising:

receiving from an electronic device of the user during a first user session, a first query having one or more first query terms and first location data, the first location data indicating a first geographic location of the electronic device;

determining a category of a decision-making or action-taking process associated with the user session based at least in part on the first location data;

determining a first stage of the plurality of stages that are associated with the first user session based on the first query terms, the first location data, and the category of the decision-making or action-taking process using a stage prediction model, the stage prediction model having been generated through a training process based on user query logs;

identifying one or more content items that are associated with the first stage;

transmitting to the electronic device a first content item selected from the one or more content items associated with the first stage;

receiving, from the electronic device, a second query having second query terms and second location data;

analyzing the first query terms and the second query terms;

calculating a difference significance value between the first query terms and the second query terms based on the analysis;

determining a second stage of the plurality of stages based on the difference significant value between the first query terms and the second query terms; and transmitting to the electronic device a second content item associated with the second stage.

7. The computer-readable medium of claim 6, wherein the second location data indicates a second geographic location of the electronic device; and
wherein the first content item and the second content item are different content items.

8. The computer-readable medium of claim 7, wherein first location data and second location data refer to a same geographic location.

9. The computer-readable medium of claim 6,
wherein the user session is in the second stage if the difference significant value is greater than a predetermined threshold.

10. The computer-readable medium of claim 6, wherein determining the category is performed further based at least in part on the first query terms.

11. A data processing system, comprising:
at least one hardware processor;
a memory coupled to the processor, the memory having stored thereon executable instructions that, when executed by the at least one hardware processor, perform operations for determining content to be presented to a user during a user session, the user session having a plurality of stages, the operations including
receiving from an electronic device of the user during a first user session, a first query having one or more first query terms and first location data, the first location data indicating a first geographic location of the electronic device,
determining a category of a decision-making or action-taking process associated with the user session based at least in part on the first location data,
determining a first stage of the plurality of stages that are associated with the first user session based on the first query terms, the first location data, and the category of the decision-making or action-taking process using a stage prediction model, the stage prediction model having been generated through a training process based on user query logs,
identifying one or more content items that are associated with the first stage,
transmitting to the electronic device a first content item selected from the one or more content items associated with the first stage;
receiving, from the electronic device, a second query having second query terms and second location data;
analyzing the first query terms and the second query terms;
calculating a difference significance value between the first query terms and the second query terms based on the analysis;

determining a second stage of the plurality of stages based on the difference significant value between the first query terms and the second query terms; and transmitting to the electronic device a second content item associated with the second stage.

12. The system of claim 11, wherein the second location data indicates a second geographic location of the electronic device; and wherein the first content item and the second content item are different content items.

13. The system of claim 12, wherein first location data and second location data refer to a same geographic location.

14. The system of claim 11, wherein the user session is in the second stage if the difference significant value is greater than a predetermined threshold.

15. The system of claim 11, wherein determining the category is performed further based at least in part on the first query terms.

* * * * *